US012785289B2

(12) United States Patent
Cooper et al.

(10) Patent No.: US 12,785,289 B2
(45) Date of Patent: Nov. 3, 2026

(54) ELECTRONIC DEVICES HAVING COMPACT ULTRA-WIDEBAND ANTENNA MODULES

(71) Applicant: Apple Inc., Cupertino, CA (US)

(72) Inventors: Aaron J Cooper, San Jose, CA (US); Amin Tayebi, San Jose, CA (US); Ana Papio Toda, San Jose, CA (US); Carlo Di Nallo, Belmont, CA (US)

( * ) Notice: Subject to any disclaimer, the term of this patent is extended or adjusted under 35 U.S.C. 154(b) by 125 days.

(21) Appl. No.: 18/890,412

(22) Filed: Sep. 19, 2024

(65) Prior Publication Data

US 2025/0015511 A1 Jan. 9, 2025

Related U.S. Application Data

(63) Continuation of application No. 17/730,039, filed on Apr. 26, 2022, now Pat. No. 12,126,085.

(60) Provisional application No. 63/243,548, filed on Sep. 13, 2021.

(51) Int. Cl.
*H01Q 1/24* (2006.01)
*H01Q 19/00* (2006.01)
*H01Q 21/06* (2006.01)

(52) U.S. Cl.
CPC ........... *H01Q 19/005* (2013.01); *H01Q 1/241* (2013.01); *H01Q 21/065* (2013.01)

(58) Field of Classification Search
CPC .......... H01Q 1/24; H01Q 1/241; H01Q 1/243; H01Q 5/25; H01Q 9/0414; H01Q 9/045; H01Q 9/0407; H01Q 19/005; H01Q 21/065; H01Q 1/22; H01Q 1/38; H01Q 1/48
See application file for complete search history.

(56) References Cited

U.S. PATENT DOCUMENTS

| | | | |
|---|---|---|---|
| 6,639,558 | B2 | 10/2003 | Kellerman et al. |
| 10,741,906 | B2 | 8/2020 | Gomez et al. |
| 10,741,933 | B2 | 8/2020 | Yong et al. |
| 10,931,013 | B2 | 2/2021 | Cooper et al. |
| 10,957,978 | B2 | 3/2021 | Cooper et al. |
| 11,088,452 | B2 | 8/2021 | Avser et al. |
| 11,095,017 | B2 | 8/2021 | Cooper et al. |

(Continued)

FOREIGN PATENT DOCUMENTS

| | | | |
|---|---|---|---|
| CN | 112563728 | A | 3/2021 |
| KR | 100789360 | B1 | 12/2007 |

(Continued)

*Primary Examiner* — Thai Pham
(74) *Attorney, Agent, or Firm* — Treyz Law Group, P.C.; Michael H. Lyons; Jinie M. Guihan

(57) ABSTRACT

An electronic device may have an antenna module with a triplet of antennas on a substrate. The triplet may include a first antenna with a radiating element formed from a patch on the substrate and second and third antennas having radiating elements formed from patches on that extend across a smaller lateral area than the patch in the first antenna. The patches in the second and third antennas may have extended electrical lengths formed from parasitic patches embedded within the substrate that are coupled to opposing edges of the patches by fences of conductive vias. The antenna module may include phased antenna arrays for conveying centimeter/millimeter wave signals. Signal conductors for the antennas may be distributed across multiple metallization layers of the substrate.

18 Claims, 12 Drawing Sheets

(56) References Cited

U.S. PATENT DOCUMENTS

| | | | | |
|---|---|---|---|---|
| 11,205,847 | B2 | 12/2021 | Sherlock | |
| 11,239,550 | B2 | 2/2022 | Cooper et al. | |
| 2019/0020121 | A1* | 1/2019 | Paulotto | H01Q 21/28 |
| 2019/0221935 | A1* | 7/2019 | Chen | H01Q 21/08 |
| 2019/0319367 | A1* | 10/2019 | Edwards | H01Q 1/243 |
| 2020/0106158 | A1* | 4/2020 | Gomez Angulo | G06F 1/1698 |
| 2020/0106192 | A1 | 4/2020 | Avser et al. | |
| 2020/0161766 | A1 | 5/2020 | Liu et al. | |
| 2021/0098882 | A1* | 4/2021 | Paulotto | H01Q 1/243 |
| 2021/0328334 | A1* | 10/2021 | Cooper | H01Q 5/35 |
| 2022/0085506 | A1 | 3/2022 | Lim et al. | |
| 2022/0094053 | A1 | 3/2022 | Jiang et al. | |
| 2022/0094061 | A1* | 3/2022 | Yong | H01Q 1/243 |

FOREIGN PATENT DOCUMENTS

| | | | |
|---|---|---|---|
| KR | 20200036736 | A | 4/2020 |
| KR | 20200078458 | A | 7/2020 |
| MY | 180646 | A | 12/2020 |
| WO | 2021085669 | A1 | 5/2021 |

* cited by examiner

ELECTRONIC DEVICES HAVING COMPACT ULTRA-WIDEBAND ANTENNA MODULES

This application is a continuation of non-provisional patent application Ser. No. 17/730,039, filed Apr. 26, 2022, which claims the benefit of U.S. Provisional Patent Application No. 63/243,548, filed Sep. 13, 2021, which are hereby incorporated by reference herein in their entireties.

BACKGROUND

This disclosure relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry. The wireless circuitry may include an antenna module. The antenna module may have a dielectric substrate with stacked layers.

A triplet of antennas may be disposed on the substrate. The triplet of antennas may include first, second, and third antennas that convey radio-frequency signals in a first ultra-wideband communications band. The first antenna may have an antenna radiating element formed from a patch on the substrate. The second and third antennas may have antenna radiating elements formed from patches on the substrate that extend across a smaller lateral area than the patch in the first antenna. The patches in the second and third antennas may have extended electrical lengths formed from parasitic patches embedded within the substrate that are coupled to opposing edges of the patches by fences of conductive vias. This may serve to minimize the size of the antenna module. A standalone antenna may be laterally interposed between the antennas in the triplet and may convey radio-frequency signals in a second ultra-wideband communications band that is lower than the first ultra-wideband communications band.

If desired, the antenna module may include first and second phased antenna arrays for conveying radio-frequency signals in first and second centimeter/millimeter wave frequency bands. The first and/or second arrays may be laterally interposed between the antennas in the triplet. One of the antennas in the triplet may have a patch element with a first arm that covers the first ultra-wideband communications band and a second arm that covers the second ultra-wideband communications band. The first and second arms may be fed by separate signal conductors. The signal conductors may be distributed across multiple metallization layers of the substrate to accommodate the complex signal routing for the antenna module.

DETAILED DESCRIPTION

Figure 1:
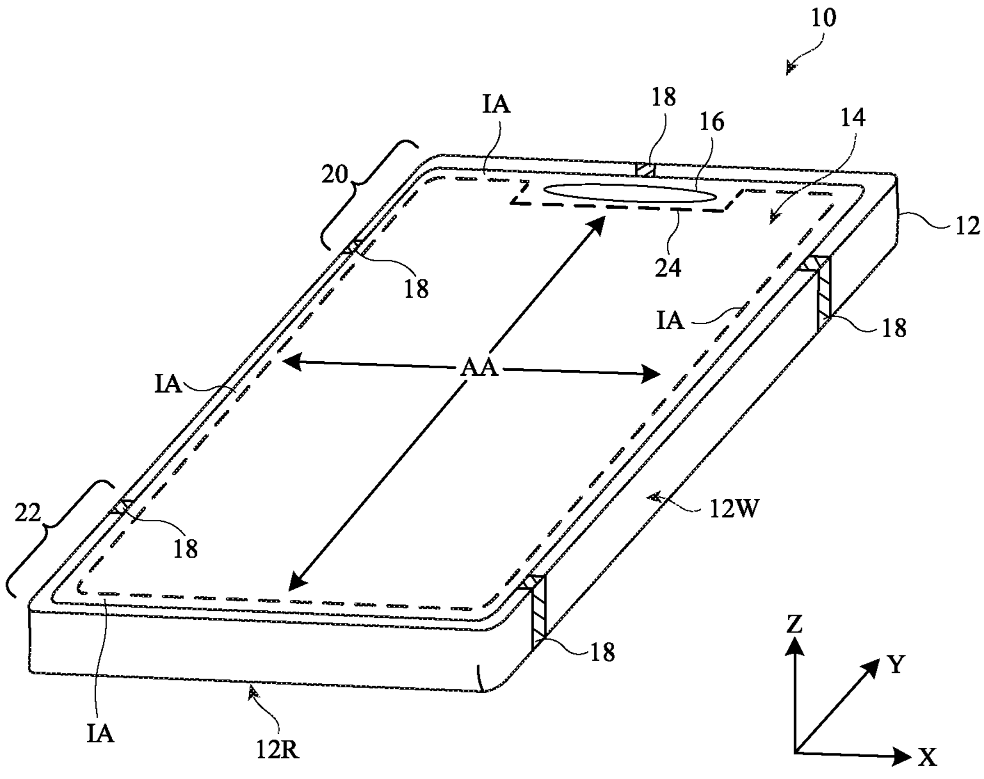
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.). Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14. In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
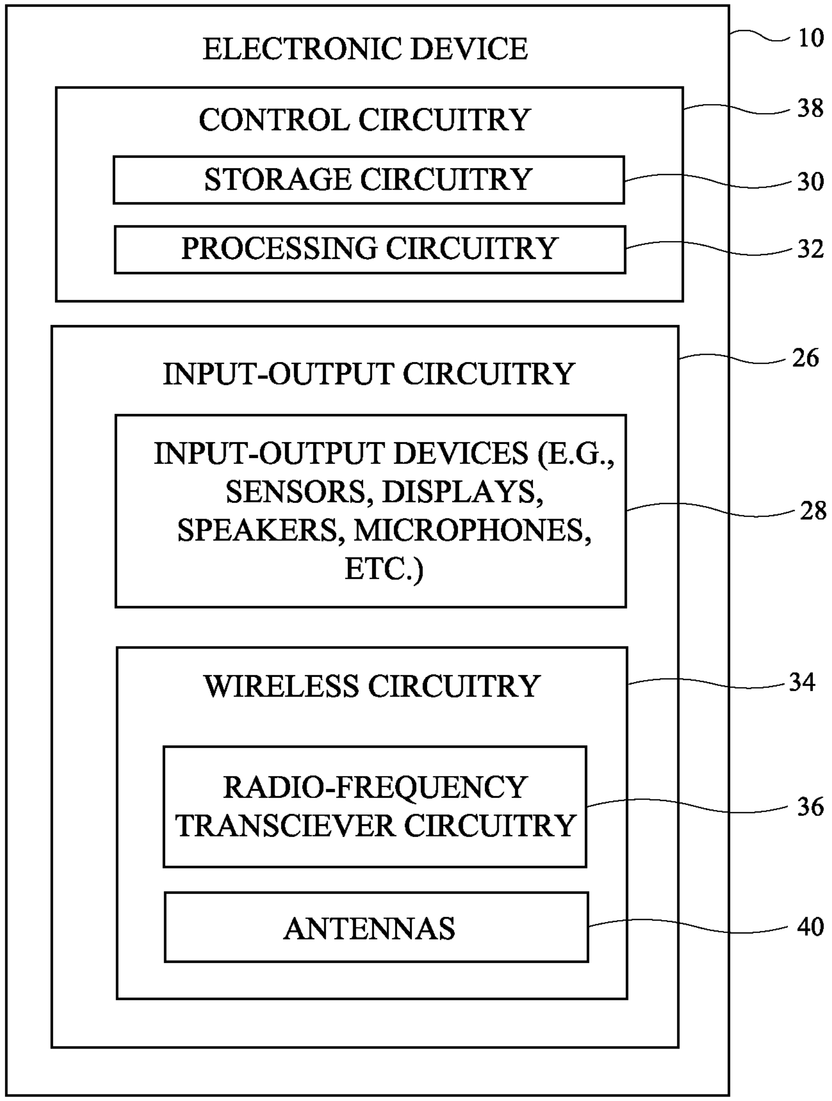
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include on one or more processors (e.g., microprocessors), microcontrollers, digital signal processors, host processors, baseband processor integrated circuits, application specific integrated circuits, central processing units (CPUs), graphics processing units, etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry (e.g., one or more baseband processors) or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals (e.g., one or more RF front end modules, etc.). Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio 44 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHZ WLAN band (e.g., from 5180 to 5825 MHz), a Wi-Fi® 6E band (e.g., from 5925-7125 MHz), and/or other Wi-Fi® bands (e.g., from 1875-5160 MHZ), wireless personal area network (WPAN) frequency bands such as the 2.4 GHz Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHZ, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHZ), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHZ), communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHZ, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHZ, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time-of-flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals). Different types of antennas may be used for different bands and combinations of bands.

In one suitable arrangement that is described herein as an example, antennas 40 include a first set of antennas for conveying radio-frequency signals in UWB frequency band (s) and a second set of antennas that form one or more phased antenna arrays. The first set of antennas may include a triplet or doublet of antennas for conveying radio-frequency signals in UWB frequency bands (sometimes referred to herein as UWB antennas). The phased antenna arrays may convey radio-frequency signals using millimeter and/or centimeter wave signals.

Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. In one suitable arrangement that is described herein as an example, each phased antenna array may convey radio-frequency signals in a first 5G NR FR2 frequency band around 24-30 GHz and a second 5G NR FR2 frequency band around 37-43 GHZ. Each phased antenna array may include a first set of antennas that convey radio-frequency signals in the first 5G NR FR2 frequency band and a second set of antennas that convey radio-frequency signals in the second 5G NR FR2 frequency band, for example.

Figure 3:
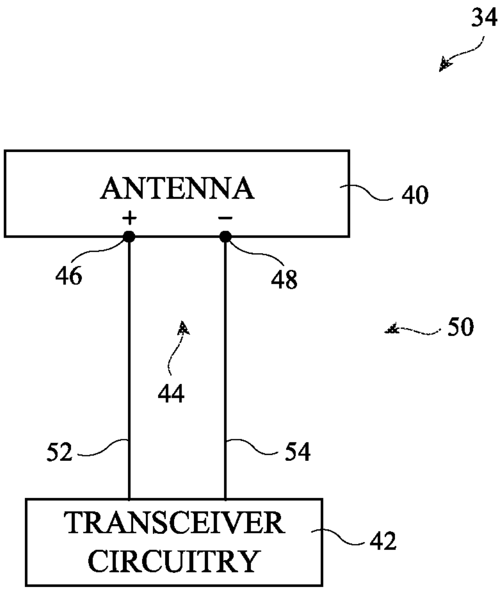
FIG. 3 is a schematic diagram of illustrative wireless circuitry in accordance with some embodiments.

A schematic diagram of wireless circuitry 34 is shown in FIG. 3. As shown in FIG. 3, wireless circuitry 34 may include transceiver circuitry 36 that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as positive signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc. In one suitable arrangement that is sometimes described herein as an example, radio-frequency transmission line path 50 may include a stripline transmission line coupled to transceiver circuitry 36 and a microstrip transmission line coupled between the stripline transmission line and antenna 40.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, or other antenna having an antenna feed 44 with a positive antenna feed terminal such as positive antenna feed terminal 46 and a ground antenna feed terminal such as ground antenna feed terminal 48. Positive antenna feed terminal 46 may be coupled to an antenna resonating element for antenna 40. Ground antenna feed terminal 48 may be coupled to an antenna ground for antenna 40.

Signal conductor 52 may be coupled to positive antenna feed terminal 46 and ground conductor 54 may be coupled to ground antenna feed terminal 48. Other types of antenna feed arrangements may be used if desired. For example, antenna 40 may be fed using multiple feeds each coupled to a respective port of transceiver circuitry 36 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 36 and the positive antenna feed terminals if desired (e.g., to selectively activate one or more positive antenna feed terminals at any given time). The illustrative feeding configuration of FIG. 3 is merely illustrative.

During operation, device 10 may communicate with external wireless equipment. If desired, device 10 may use radio-frequency signals conveyed between device 10 and the external wireless equipment to identify a location of the external wireless equipment relative to device 10. Device 10 may identify the relative location of the external wireless equipment by identifying a range to the external wireless equipment (e.g., the distance between the external wireless equipment and device 10) and the angle of arrival (AoA) of radio-frequency signals from the external wireless equipment (e.g., the angle at which radio-frequency signals are received by device 10 from the external wireless equipment).

Figure 4:
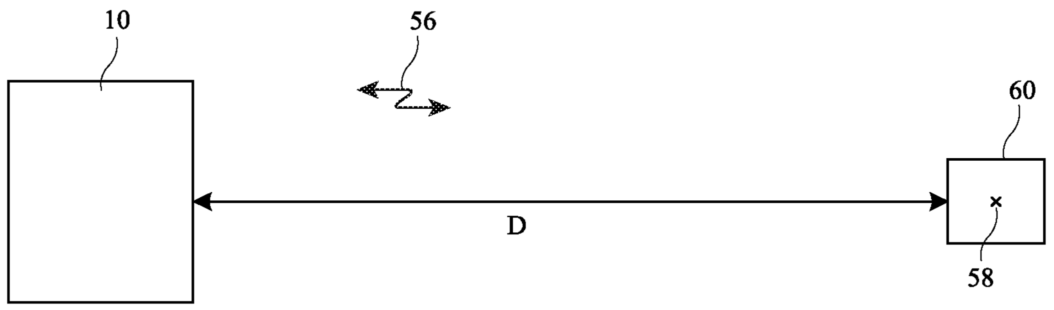
FIG. 4 is a diagram of an illustrative electronic device in wireless communication with an external node in a network in accordance with some embodiments.

FIG. 4 is a diagram showing how device 10 may determine a distance D between device 10 and external wireless equipment such as wireless network node 60 (sometimes referred to herein as wireless equipment 60, wireless device 60, external device 60, or external equipment 60). Node 60 may include devices that are capable of receiving and/or transmitting radio-frequency signals such as radio-frequency signals 56. Node 60 may include tagged devices (e.g., any suitable object that has been provided with a wireless receiver and/or a wireless transmitter), electronic equipment (e.g., an infrastructure-related device), and/or other electronic devices (e.g., devices of the type described in connection with FIG. 1, including some or all of the same wireless communications capabilities as device 10).

For example, node 60 may be a laptop computer, a tablet computer, a somewhat smaller device such as a wrist-watch device, pendant device, headphone device, earpiece device, headset device (e.g., virtual or augmented reality headset devices), or other wearable or miniature device, a handheld device such as a cellular telephone, a media player, or other small portable device. Node 60 may also be a set-top box, a camera device with wireless communications capabilities, a desktop computer, a display into which a computer or other processing circuitry has been integrated, a display without an integrated computer, or other suitable electronic equipment. Node 60 may also be a key fob, a wallet, a book, a pen, or other object that has been provided with a low-power transmitter (e.g., an RFID transmitter or other transmitter). Node 60 may be electronic equipment such as a thermostat, a smoke detector, a Bluetooth® Low Energy (Bluetooth LE) beacon, a Wi-Fi® wireless access point, a wireless base station, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device. Device 10 may also be one of these types of devices if desired.

As shown in FIG. 4, device 10 may communicate with node 60 using wireless radio-frequency signals 56. Radio-frequency signals 56 may include Bluetooth® signals, near-field communications signals, wireless local area network signals such as IEEE 802.11 signals, millimeter wave communication signals such as signals at 60 GHz, UWB signals, other radio-frequency wireless signals, infrared signals, etc. In one suitable arrangement that is described herein by example, radio-frequency signals 56 are UWB signals conveyed in multiple UWB communications bands such as the 6.5 GHz and 8 GHz UWB communications bands. Radio-frequency signals 56 may be used to determine and/or convey information such as location and orientation information. For example, control circuitry 38 in device 10 (FIG. 2) may determine the location 58 of node 60 relative to device 10 using radio-frequency signals 56.

In arrangements where node 60 is capable of sending or receiving communications signals, control circuitry 38 (FIG. 2) on device 10 may determine distance D using radio-frequency signals 56 of FIG. 4. The control circuitry may determine distance D using signal strength measurement schemes (e.g., measuring the signal strength of radio-frequency signals 56 from node 60) or using time-based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, the control circuitry may use information from Global Positioning System receiver circuitry, proximity sensors (e.g., infrared proximity sensors or other proximity sensors), image data from a camera, motion sensor data from motion sensors, and/or using other circuitry on device 10 to help determine distance D. In addition to determining the distance D between device 10 and node 60, the control circuitry may determine the orientation of device 10 relative to node 60.

Figure 5:
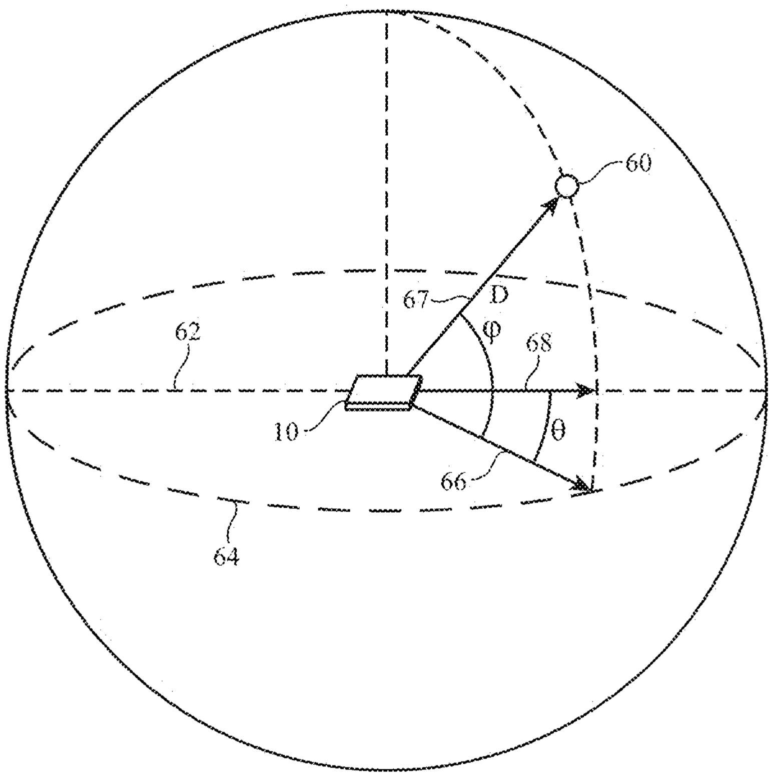
FIG. 5 is a diagram showing how the location (e.g., range and angle of arrival) of an external node in a network may be determined relative to an electronic device in accordance with some embodiments.

FIG. 5 illustrates how the position and orientation of device 10 relative to nearby nodes such as node 60 may be determined. In the example of FIG. 5, the control circuitry on device 10 (e.g., control circuitry 38 of FIG. 2) uses a horizontal polar coordinate system to determine the location and orientation of device 10 relative to node 60. In this type of coordinate system, the control circuitry may determine an azimuth angle θ and/or an elevation angle φ to describe the position of nearby nodes 60 relative to device 10. The control circuitry may define a reference plane such as local horizon 64 and a reference vector such as reference vector 68. Local horizon 64 may be a plane that intersects device 10 and that is defined relative to a surface of device 10 (e.g., the front or rear face of device 10). For example, local horizon 64 may be a plane that is parallel to or coplanar with display 14 of device 10 (FIG. 1). Reference vector 68 (sometimes referred to as the "north" direction) may be a vector in local horizon 64. If desired, reference vector 68 may be aligned with longitudinal axis 62 of device 10 (e.g., an axis running lengthwise down the center of device 10 and parallel to the longest rectangular dimension of device 10, parallel to the Y-axis of FIG. 1). When reference vector 68 is aligned with longitudinal axis 62 of device 10, reference vector 68 may correspond to the direction in which device 10 is being pointed.

Azimuth angle θ and elevation angle φ may be measured relative to local horizon 64 and reference vector 68. As shown in FIG. 5, the elevation angle φ (sometimes referred to as altitude) of node 60 is the angle between node 60 and local horizon 64 of device 10 (e.g., the angle between vector 67 extending between device 10 and node 60 and a coplanar vector 66 extending between device 10 and local horizon 64). The azimuth angle θ of node 60 is the angle of node 60 around local horizon 64 (e.g., the angle between reference vector 68 and vector 66). In the example of FIG. 5, the azimuth angle θ and elevation angle φ of node 60 are greater than 0°.

If desired, other axes besides longitudinal axis 62 may be used to define reference vector 68. For example, the control circuitry may use a horizontal axis that is perpendicular to longitudinal axis 62 as reference vector 68. This may be useful in determining when nodes 60 are located next to a side portion of device 10 (e.g., when device 10 is oriented side-to-side with one of nodes 60).

After determining the orientation of device 10 relative to node 60, the control circuitry on device 10 may take suitable action. For example, the control circuitry may send information to node 60, may request and/or receive information from 60, may use display 14 (FIG. 1) to display a visual indication of wireless pairing with node 60, may use speakers to generate an audio indication of wireless pairing with node 60, may use a vibrator, a haptic actuator, or other mechanical element to generate haptic output indicating wireless pairing with node 60, may use display 14 to display a visual indication of the location of node 60 relative to device 10, may use speakers to generate an audio indication of the location of node 60, may use a vibrator, a haptic actuator, or other mechanical element to generate haptic output indicating the location of node 60, and/or may take other suitable action.

In one suitable arrangement, device 10 may determine the distance between the device 10 and node 60 and the orientation of device 10 relative to node 60 using two or more ultra-wideband antennas. The ultra-wide band antennas may receive radio-frequency signals from node 60 (e.g., radio-frequency signals 56 of FIG. 4). Time stamps in the wireless communication signals may be analyzed to determine the time of flight of the wireless communication signals and thereby determine the distance (range) between device 10 and node 60. Additionally, angle of arrival (AoA) measurement techniques may be used to determine the orientation of electronic device 10 relative to node 60 (e.g., azimuth angle θ and elevation angle ¢).

In angle of arrival measurement, node 60 transmits a radio-frequency signal to device 10 (e.g., radio-frequency signals 56 of FIG. 4). Device 10 may measure a delay in arrival time of the radio-frequency signals between the two or more ultra-wideband antennas. The delay in arrival time (e.g., the difference in received phase at each ultra-wideband antenna) can be used to determine the angle of arrival of the radio-frequency signal (and therefore the angle of node 60 relative to device 10). Once distance D and the angle of arrival have been determined, device 10 may have knowledge of the precise location of node 60 relative to device 10.

Figure 6:
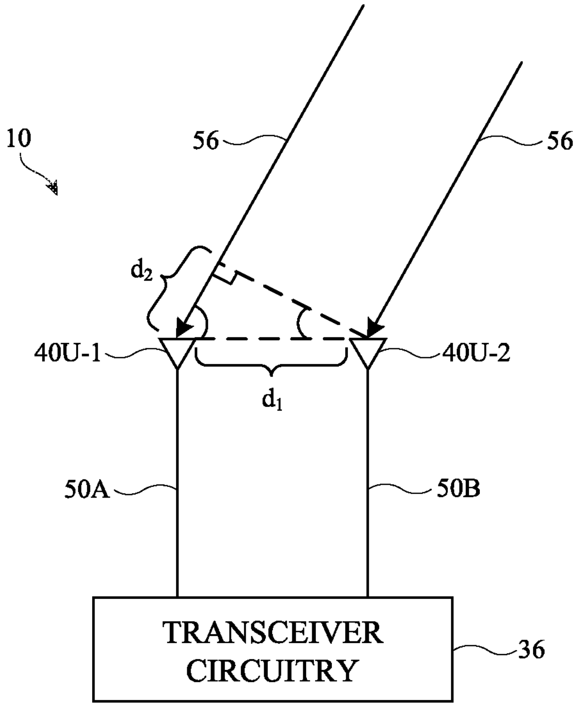
FIG. 6 is a diagram showing how illustrative ultra-wideband antennas in an electronic device may be used for detecting angle of arrival in accordance with some embodiments.

FIG. 6 is a schematic diagram showing how angle of arrival measurement techniques may be used to determine the orientation of device 10 relative to node 60. Device 10 may include multiple antennas 40 for conveying radio-frequency signals in one or more UWB frequency bands (sometimes referred to herein as ultra-wideband antennas 40U). As shown in FIG. 6, the ultra-wideband antennas 40U in device 10 may include at least a first ultra-wideband antenna 40U-1 and a second ultra-wideband antenna 40U-2. Ultra-wideband antennas 40U-1 and 40U-2 may be coupled to transceiver circuitry 36 over respective radio-frequency transmission line paths 50 (e.g., a first radio-frequency transmission line path 50A and a second radio-frequency transmission line path 50B). Transceiver circuitry 36 and ultra-wideband antennas 40U-1 and 40U-2 may operate at UWB frequencies (e.g., transceiver circuitry 36 may convey UWB signals using ultra-wideband antennas 40U-1 and 40U-2).

Ultra-wideband antennas 40U-1 and 40U-2 may each receive radio-frequency signals 56 from node 60 (FIG. 5). Ultra-wideband antennas 40U-1 and 40U-2 may be laterally separated by a distance $d_1$, where ultra-wideband antenna 40U-1 is farther away from node 60 than ultra-wideband antenna 40U-2 (in the example of FIG. 6). Therefore, radio-frequency signals 56 travel a greater distance to reach ultra-wideband antenna 40U-1 than ultra-wideband antenna 40U-2. The additional distance between node 60 and ultra-wideband antenna 40U-1 is shown in FIG. 6 as distance $d_2$. FIG. 6 also shows angles a and b (where a+b=90°).

Distance $d_2$ may be determined as a function of angle a or angle b (e.g., $d_2=d_1*\sin(a)$ or $d_2=d_1*\cos(b)$). Distance $d_2$ may also be determined as a function of the phase difference between the signal received by ultra-wideband antenna 40U-1 and the signal received by ultra-wideband antenna 40U-2 (e.g., $d_2=(PD)*\lambda/(2*\pi)$), where PD is the phase difference (sometimes written "$\Delta\phi$") between the signal received by ultra-wideband antenna 40U-1 and the signal received by ultra-wideband antenna 40U-2, and $\lambda$ is the wavelength of radio-frequency signals 56. Device 10 may include phase measurement circuitry coupled to each antenna to measure the phase of the received signals and to identify phase difference PD (e.g., by subtracting the phase measured for one antenna from the phase measured for the other antenna). The two equations for $d_2$ may be set equal to each other (e.g., $d_1*\sin(a)=(PD)*\lambda/(2*\pi)$) and rearranged to solve for the angle a (e.g., $a=\sin^{-1}((PD)*\lambda/(2*\pi*d_1))$ or the angle b. Therefore, the angle of arrival may be determined (e.g., by control circuitry 38 of FIG. 2) based on the known (predetermined) distance $d_1$ between ultra-wideband antennas 40U-1 and 40U-2, the detected (measured) phase difference PD between the signal received by ultra-wideband antenna 40U-1 and the signal received by ultra-wideband antenna 40U-2, and the known wavelength (frequency) of the received radio-frequency signals 56. Angles a and/or b of FIG. 6 may be converted to spherical coordinates to obtain azimuth angle $\theta$ and elevation angle $\varphi$ of FIG. 5, for example. Control circuitry 38 (FIG. 2) may determine the angle of arrival of radio-frequency signals 56 by calculating one or both of azimuth angle $\theta$ and elevation angle $\varphi$.

Distance $d_1$ may be selected to case the calculation for phase difference PD between the signal received by ultra-wideband antenna 40U-1 and the signal received by ultra-wideband antenna 40U-2. For example, $d_1$ may be less than or equal to one half of the wavelength (e.g., effective wavelength) of the received radio-frequency signals 56 (e.g., to avoid multiple phase difference solutions).

With two antennas for determining angle of arrival (as in FIG. 6), the angle of arrival within a single plane may be determined. For example, ultra-wideband antennas 40U-1 and 40U-2 in FIG. 6 may be used to determine azimuth angle $\theta$ of FIG. 5. A third ultra-wideband antenna may be included to enable angle of arrival determination in multiple planes (e.g., azimuth angle $\theta$ and elevation angle $\varphi$ of FIG. 5 may both be determined). The three ultra-wideband antennas in this scenario may form a so-called triplet of ultra-wideband antennas, where each antenna in the triplet is arranged to approximately lie on a respective corner of a right triangle (e.g., the triplet may include ultra-wideband antennas 40U-1 and 40U-2 of FIG. 6 and a third antenna located at distance $d_1$ from ultra-wideband antenna 40U-1 in a direction perpendicular to the vector between ultra-wideband antennas 40U-1 and 40U-2) or using some other predetermined relative positioning. Triplets of ultra-wideband antennas 40U may be used to determine angle of arrival in two planes (e.g., to determine both azimuth angle $\theta$ and elevation angle $\varphi$ of FIG. 5). Triplets of ultra-wideband antennas 40U and/or doublets of ultra-wideband antennas 40U (e.g., a pair of antennas such as ultra-wideband antennas 40U-1 and 40U-2 of FIG. 6) may be used in device 10 to determine angle of arrival. If desired, different doublets of antennas may be oriented orthogonally with respect to each other in device 10 to recover angle of arrival in two dimensions (e.g., using two or more orthogonal doublets of ultra-wideband antennas 40U that each measure angle of arrival in a single respective plane).

Figure 7:
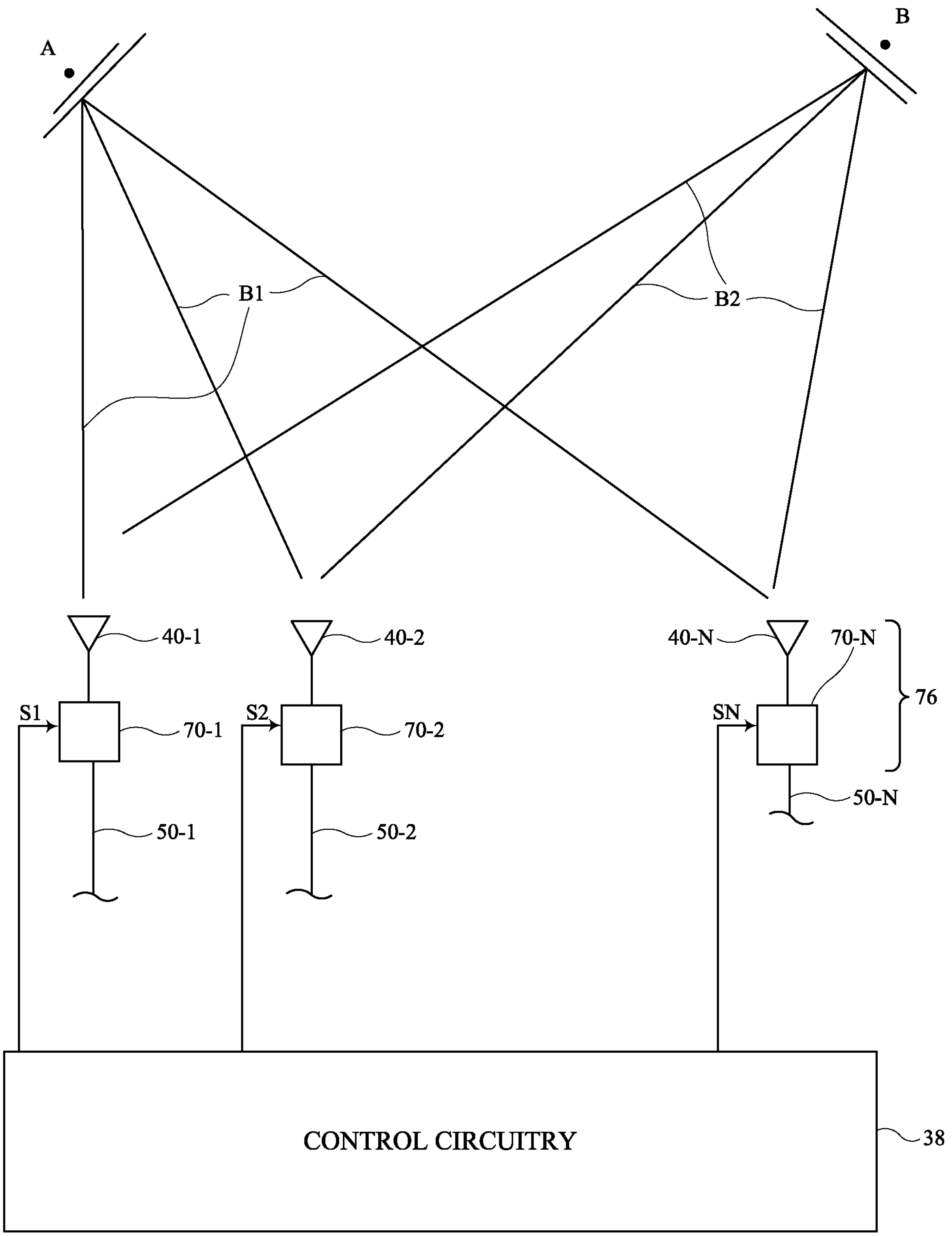
FIG. 7 is a diagram of an illustrative phased antenna array that may be adjusted using control circuitry to direct a beam of signals in accordance with some embodiments.

The antennas 40 in device 10 may also include two or more antennas 40 that convey radio-frequency signals at frequencies greater than 10 GHz. Due to the substantial signal attenuation at frequencies greater than 10 GHz, these antennas may be arranged into one or more corresponding phased antenna arrays. FIG. 7 shows how antennas 40 for handling radio-frequency signals at millimeter and centimeter wave frequencies may be formed in a corresponding phased antenna array 76.

As shown in FIG. 7, phased antenna array 76 (sometimes referred to herein as array 76, antenna array 76, or array 76 of antennas 40) may be coupled to radio-frequency transmission line paths 50. For example, a first antenna 40-1 in phased antenna array 76 may be coupled to a first radio-frequency transmission line path 50-1, a second antenna 40-2 in phased antenna array 76 may be coupled to a second radio-frequency transmission line path 50-2, an Nth antenna 40-N in phased antenna array 76 may be coupled to an Nth radio-frequency transmission line path 50-N, etc. While antennas 40 are described herein as forming a phased antenna array, the antennas 40 in phased antenna array 76 may sometimes also be referred to as collectively forming a single phased array antenna.

Antennas 40 in phased antenna array 76 may be arranged in any desired number of rows and columns or in any other desired pattern (e.g., the antennas need not be arranged in a grid pattern having rows and columns). During signal transmission operations, radio-frequency transmission line paths 50 may be used to supply signals (e.g., radio-frequency signals such as millimeter wave and/or centimeter wave signals) from transceiver circuitry 36 (FIG. 2) to phased antenna array 76 for wireless transmission. During signal reception operations, radio-frequency transmission line paths 50 may be used to supply signals received at phased antenna array 76 (e.g., from external wireless equipment or transmitted signals that have been reflected off of external objects) to transceiver circuitry 36 (FIG. 3).

The use of multiple antennas 40 in phased antenna array 76 allows beam steering arrangements to be implemented by controlling the relative phases and magnitudes (amplitudes) of the radio-frequency signals conveyed by the antennas. In the example of FIG. 7, antennas 40 each have a corresponding radio-frequency phase and magnitude controller 70 (e.g., a first phase and magnitude controller 70-1 interposed on radio-frequency transmission line path 50-1 may control phase and magnitude for radio-frequency signals handled by antenna 40-1, a second phase and magnitude controller 70-2 interposed on radio-frequency transmission line path 50-2 may control phase and magnitude for radio-frequency signals handled by antenna 40-2, an Nth phase and magnitude controller 70-N interposed on radio-frequency transmission line path 50-N may control phase and magnitude for radio-frequency signals handled by antenna 40-N, etc.).

Phase and magnitude controllers 70 may each include circuitry for adjusting the phase of the radio-frequency signals on radio-frequency transmission line paths 50 (e.g., phase shifter circuits) and/or circuitry for adjusting the magnitude of the radio-frequency signals on radio-frequency transmission line paths 50 (e.g., power amplifier and/or low noise amplifier circuits). Phase and magnitude controllers 70 may sometimes be referred to collectively herein as beam steering circuitry (e.g., beam steering circuitry that steers the beam of radio-frequency signals transmitted and/or received by phased antenna array 76).

Phase and magnitude controllers 70 may adjust the relative phases and/or magnitudes of the transmitted signals that are provided to each of the antennas in phased antenna array 76 and may adjust the relative phases and/or magnitudes of the received signals that are received by phased antenna array 76. Phase and magnitude controllers 70 may, if desired, include phase detection circuitry for detecting the phases of the received signals that are received by phased antenna array 76. The term "beam" or "signal beam" may be used herein to collectively refer to wireless signals that are transmitted and received by phased antenna array 76 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 70 are adjusted to produce a first set of phases and/or magnitudes for transmitted radio-frequency signals, the transmitted signals will form a transmit beam as shown by beam B1 of FIG. 7 that is oriented in the direction of point A. If, however, phase and magnitude controllers 70 are adjusted to produce a second set of phases and/or magnitudes for the transmitted signals, the transmitted signals will form a transmit beam as shown by beam B2 that is oriented in the direction of point B. Similarly, if phase and magnitude controllers 70 are adjusted to produce the first set of phases and/or magnitudes, radio-frequency signals (e.g., radio-frequency signals in a receive beam) may be received from the direction of point A, as shown by beam B1. If phase and magnitude controllers 70 are adjusted to produce the second set of phases and/or magnitudes, radio-frequency signals may be received from the direction of point B, as shown by beam B2.

Each phase and magnitude controller 70 may be controlled to produce a desired phase and/or magnitude based on a corresponding control signal S received from control circuitry 38 (e.g., the phase and/or magnitude provided by phase and magnitude controller 70-1 may be controlled using control signal S1, the phase and/or magnitude provided by phase and magnitude controller 70-2 may be controlled using control signal S2, etc.). If desired, the control circuitry may actively adjust control signals S in real time to steer the transmit or receive beam in different desired directions over time. Phase and magnitude controllers 70 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 76 and external communications equipment. If the external object is located at point A of FIG. 7, phase and magnitude controllers 70 may be adjusted to steer the signal beam towards point A (e.g., to steer the pointing direction of the signal beam towards point A). Phased antenna array 76 may transmit and receive radio-frequency signals in the direction of point A. Similarly, if the external communications equipment is located at point B, phase and magnitude controllers 70 may be adjusted to steer the signal beam towards point B (e.g., to steer the pointing direction of the signal beam towards point B). Phased antenna array 76 may transmit and receive radio-frequency signals in the direction of point B. In the example of FIG. 7, beam steering is shown as being performed over a single degree of freedom for the sake of simplicity (e.g., towards the left and right on the page of FIG. 7). However, in practice, the beam may be steered over two or more degrees of freedom (e.g., in three dimensions, into and out of the page and to the left and right on the page of FIG. 7). Phased antenna array 76 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

In general, the antennas 40 in device 10 used to convey millimeter and centimeter wave signals and the antennas 40 in device 10 used to convey UWB signals may be formed using any desired antenna architecture. If desired, the antennas 40 in device 10 used to convey millimeter and centimeter wave signals and the antennas 40 in device 10 used to convey UWB signals may both each be patch antennas.

Figure 8:
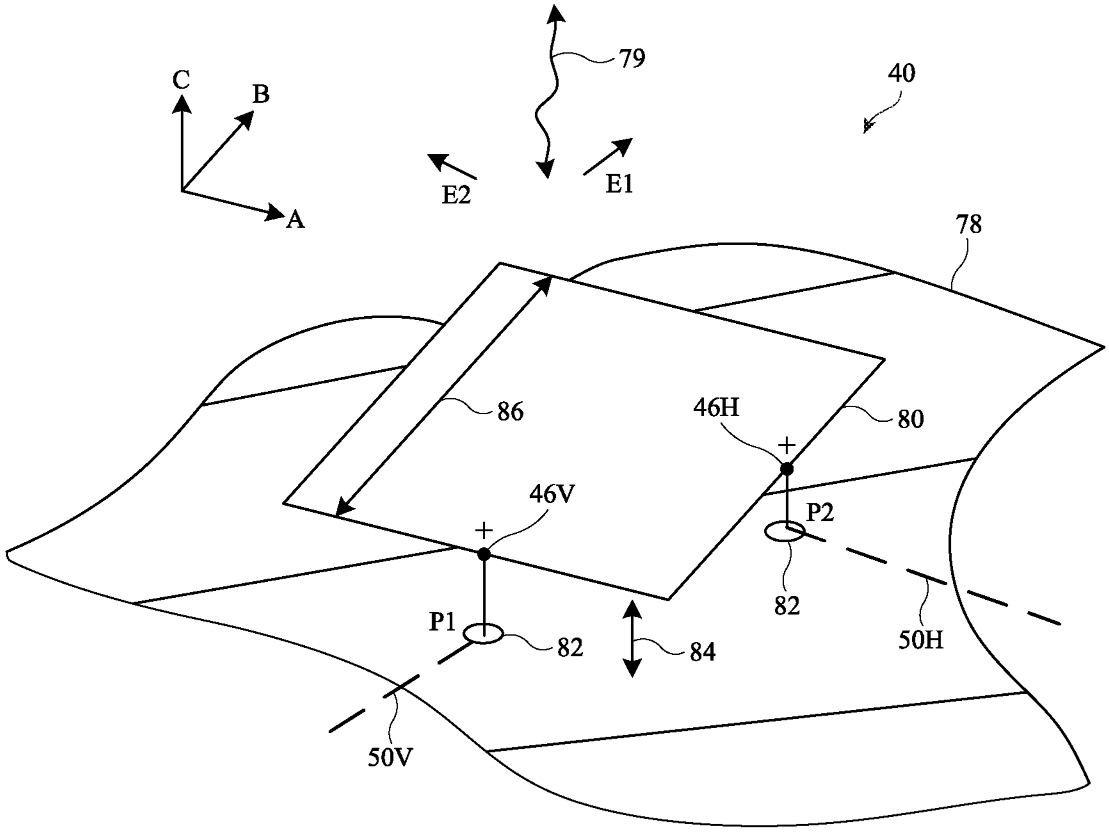
FIG. 8 is a perspective view of an illustrative patch antenna in accordance with some embodiments.

FIG. 8 is a perspective view of an illustrative patch antenna. As shown in FIG. 8, antenna 40 may have a patch antenna resonating element 80 that is separated from and parallel to an antenna ground plane such as ground plane 78 (sometimes referred to herein as antenna ground 78). Patch antenna resonating element 80 may lie within a plane such as the A-B plane of FIG. 8 (e.g., the lateral surface area of element 80 may lie in the A-B plane). Patch antenna resonating element 80 may sometimes be referred to herein as patch 80, patch element 80, patch resonating element 80, antenna resonating element 80, or resonating element 80. Ground plane 78 may lie within a plane that is parallel to the plane of patch element 80. Patch element 80 and ground plane 78 may therefore lie in separate parallel planes that are separated by a distance 84. Patch element 80 and ground plane 78 may be formed from conductive traces patterned on a dielectric substrate.

The length of the sides of patch element 80 may be selected so that antenna 40 resonates at desired operating frequencies. For example, one or more sides of patch element 80 may have a length 86 that is approximately equal to half the wavelength of the signals conveyed by antenna 40 (e.g., the effective wavelength given the dielectric properties of the materials surrounding patch element 80). In one suitable arrangement, length 86 may be between 0.8 mm and 1.2 mm (e.g., approximately 1.1 mm) for covering a millimeter wave frequency band between 57 GHZ and 70 GHz or between 1.6 mm and 2.2 mm (e.g., approximately 1.85 mm) for covering a millimeter wave frequency band between 37 GHz and 41 GHz, as just two examples.

The example of FIG. 8 is merely illustrative. Patch element 80 may have a square shape in which all the sides of patch element 80 are the same length or may have a different (non-square) rectangular shape. Patch element 80 may be formed in other shapes having any desired number of straight and/or curved edges. If desired, patch element 80 and ground plane 78 may have different shapes and relative orientations.

To enhance the polarizations handled by antenna 40, antenna 40 may be provided with multiple antenna feeds. As shown in FIG. 8, antenna 40 may have a first antenna feed at antenna port P1 that is coupled to a first radio-frequency transmission line path 50 (FIG. 3) such as transmission line path 50V. Antenna 40 may also have a second feed at antenna port P2 that is coupled to a second radio-frequency transmission line path 50 such as transmission line path 50H. The first antenna feed may have a first ground feed terminal coupled to ground plane 78 (not shown in FIG. 8 for the sake of clarity) and a first positive antenna feed terminal 46V coupled to patch element 80. The second antenna feed may have a second ground feed terminal coupled to ground plane 78 (not shown in FIG. 8 for the sake of clarity) and a second positive antenna feed terminal 46H on patch element 80.

Holes or openings such as openings 82 may be formed in ground plane 78.

Transmission line path 50V may include a vertical conductor (e.g., a conductive through-via, conductive pin, metal pillar, solder bump, combinations of these, or other vertical conductive interconnect structures) that extends through opening 82 to positive antenna feed terminal 46V on patch element 80. Transmission line path 50H may include a vertical conductor that extends through opening 82 to positive antenna feed terminal 46H on patch element 80. This example is merely illustrative and, if desired, other transmission line structures may be used (e.g., coaxial cable structures, stripline transmission line structures, etc.).

When using the first antenna feed associated with port P1, antenna 40 may transmit and/or receive radio-frequency signals having a first polarization (e.g., the electric field E1 of antenna signals 79 associated with port P1 may be oriented parallel to the B-axis in FIG. 8). When using the antenna feed associated with port P2, antenna 40 may transmit and/or receive radio-frequency signals having a second polarization (e.g., the electric field E2 of antenna signals 79 associated with port P2 may be oriented parallel to the A-axis of FIG. 8 so that the polarizations associated with ports P1 and P2 are orthogonal to each other).

One of ports P1 and P2 may be used at a given time so antenna 40 operates as a single-polarization antenna or both ports may be operated at the same time so antenna 40 operates with other polarizations (e.g., as a dual-polarization antenna, a circularly-polarized antenna, an elliptically-polarized antenna, etc.). If desired, the active port may be changed over time so antenna 40 can switch between covering vertical or horizontal polarizations at a given time. Ports P1 and P2 may be coupled to different phase and magnitude controllers 70 (FIG. 7) or may both be coupled to the same phase and magnitude controller 70. If desired, ports P1 and P2 may both be operated with the same phase and magnitude at a given time (e.g., when antenna 40 acts as a dual-polarization antenna). If desired, the phases and magnitudes of radio-frequency signals conveyed over ports P1 and P2 may be controlled separately and varied over time so antenna 40 exhibits other polarizations (e.g., circular or elliptical polarizations).

If care is not taken, antennas 40 such as dual-polarization patch antennas of the type shown in FIG. 8 may have insufficient bandwidth for covering an entirety of a frequency band of interest (e.g., a frequency band at frequencies greater than 10 GHZ). For example, in scenarios where antenna 40 is configured to cover a millimeter wave communications band between 37 GHz and 40 GHz, patch element 80 as shown in FIG. 8 may have insufficient bandwidth to cover the entirety of the frequency range between 37 GHz and 40 GHz or 43.5 GHZ. If desired, antenna 40 may include one or more parasitic antenna resonating elements that serve to broaden the bandwidth of antenna 40.

The parasitic antenna resonating element(s) may overlap patch element 80 and/or be coplanar with patch element 80. The parasitic antenna resonating element(s) may sometimes be referred to herein as parasitic resonating elements, parasitic antenna elements, parasitic elements, parasitic patches, parasitic patch elements, parasitic conductors, parasitic structures, parasitics, or patches. The parasitic elements are not directly connected to an antenna feed, whereas patch element 80 is directly fed via transmission line paths 50V and 50H and is directly connected to positive antenna feed terminals 46V and 46H (e.g., positive antenna feed terminals 46V and 46H are located on patch element 80). The parasitic element(s) may create constructive perturbations of the electromagnetic field generated by patch element 80, creating new resonance(s) for antenna 40. This may serve to broaden the overall bandwidth of antenna 40. Additionally or alternatively, the parasitic element(s) may capacitively load patch element 80 to effectively (electrically) extend the electrical length of patch element 80 (e.g., length 86) for covering lower frequencies than in the absence of the parasitic element(s).

If desired, antenna 40 of FIG. 8 may be formed on a dielectric substrate (not shown in FIG. 8 for the sake of clarity). The dielectric substrate may be, for example, a rigid or printed circuit board or other dielectric substrate. The dielectric substrate may include multiple stacked dielectric layers (e.g., multiple layers of printed circuit board substrate such as multiple layers of fiberglass-filled epoxy, multiple layers of ceramic substrate, etc.). Ground plane 78, patch element 80, and the parasitic element(s) may be formed from conductive traces on different layers of the dielectric substrate.

The example of FIG. 8 is merely illustrative. Antenna 40 may have any desired number of feeds. Other feeding arrangements may be used. Antenna 40 may include any desired type of antenna resonating element structures. If desired, antenna 40 may include multiple vertically-stacked patch elements 80. Each of the vertically-stacked patch elements 80 may radiate in a respective frequency band. By forming each patch element 80 with a respective length 86, antenna 40 may be configured to cover multiple frequency bands. If desired, one or more conductive vias may couple (short) patch element 80 to ground plane 78. This may configure antenna 40 to form an inverted-F antenna (e.g., a planar inverted-F antenna), where patch element 80 forms an inverted-F antenna radiating element (e.g., a planar inverted-F antenna radiating element arm). In these configurations, the radiating element may have a length approximately equal to one-quarter the effective wavelength of operation of the antenna, for example.

In some implementations, the antennas in a triplet of ultra-wideband antennas are formed on separate substrates (e.g., separate printed circuits). However, space is often at a premium in devices such as device 10. Disposing the triplet of ultra-wideband antennas on multiple substrates or modules may occupy an excessive amount of space on device 10, can undesirably increase manufacturing cost and complexity for device 10, and can introduce mechanical non-uniformities in device 10 over time.

Figure 9:
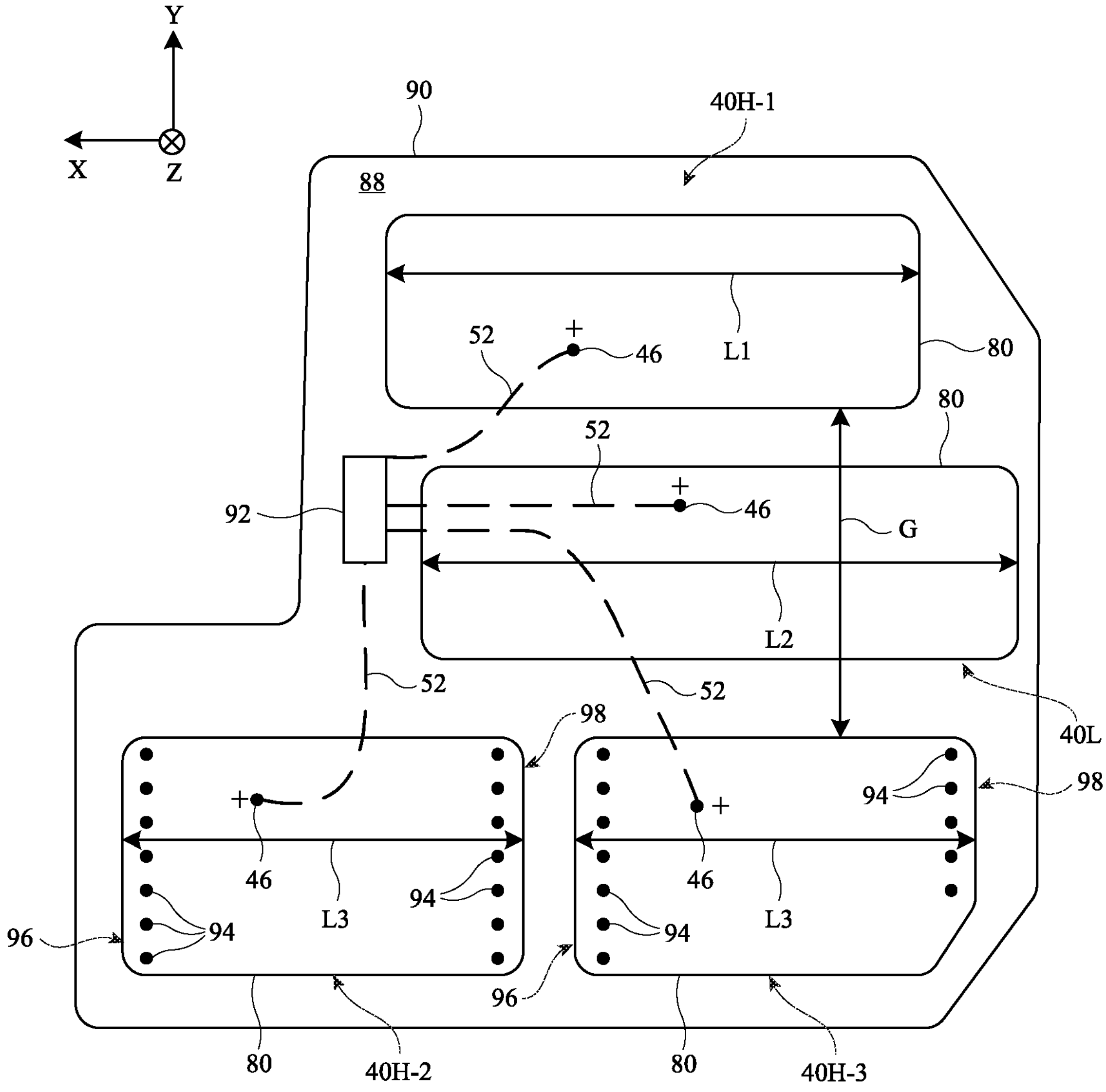
FIG. 9 is a bottom view of an illustrative antenna module having ultra-wideband antennas for covering different ultra-wideband frequencies in accordance with some embodiments.

To mitigate these issues, three or more UWB antennas may all be formed as part of the same integrated antenna module. FIG. 9 is a bottom view showing how three or more UWB antennas may be disposed on the same antenna module. As shown in FIG. 9, device 10 may include an integrated antenna module such as antenna module 90. Antenna module 90 may include a dielectric substrate such as substrate 88. Substrate 88 may, for example, be a stacked dielectric substrate having two or more vertically-stacked dielectric layers (e.g., a rigid or flexible printed circuit board).

Antenna module 90 may include a triplet of ultra-wideband antennas 40H such as ultra-wideband antennas 40H-1, 40H-2, and 40H-3. Ultra-wideband antennas 40H-1, 40H-2, and 40H-3 may each convey radio-frequency signals in a relatively high ultra-wideband communications band (e.g., an 8.0 GHz ultra-wideband communications band). Antenna module 90 may also include a standalone ultra-wideband antenna such as ultra-wideband antenna 40L (e.g., an ultra-wideband antenna that is not a part of a triplet or doublet of ultra-wideband antennas in device 10). Ultra-wideband antenna 40L may convey radio-frequency signals in a relatively low ultrawideband communications band (e.g., a 6.5 GHz ultra-wideband communications band).

Control circuitry 38 (FIG. 2) may use radio-frequency signals received by ultra-wideband antennas 40H-1, 40H-2, and 40H-3 in the high ultra-wideband communications band to estimate the range between device 10 and node 60 (FIG. 4) as well as the two or three-dimensional angle-of-arrival of the signals transmitted by node 60 (e.g., for identifying the location of node 60 relative to device 10). However, since ultra-wideband antenna 40L is a standalone antenna, control circuitry 38 may be unable to resolve angle-of-arrival using the radio-frequency signals in the low ultra-wideband communications band received by ultra-wideband antenna 40L. Instead, control circuitry 38 may use ultra-wideband antenna 40L to estimate the range between device 10 and node 60 (e.g., either on its own or in conjunction with the signals received by the triplet of UWB antennas). This is merely illustrative and, if desired, ultra-wideband antenna 40L may form part of a doublet or triplet of UWB antennas (e.g., where the remaining antennas in the doublet or triplet are located external to antenna module 90).

Ultra-wideband antennas 40H-1, 40H-2, 40H-3, and 40L may each have a respective antenna resonating element. The antenna resonating elements may overlap an antenna ground formed from ground traces in dielectric substrate 88. For example, as shown in FIG. 9, ultra-wideband antennas 40H-1, 40U-2, 40U-3, and 40L may each have a respective patch element 80 formed from patches of conductive traces on dielectric substrate 88. Corresponding positive antenna feed terminals 46 may be coupled to each patch element 80. Each positive antenna feed terminal 46 may be coupled to radio-frequency connector 92 on antenna module 90 via a respective signal path 52 (e.g., signal paths in respective radio-frequency transmission lines on substrate 88). Additionally or alternatively, a radio-frequency integrated circuit (RFIC) may be mounted to antenna module 90 for transmitting and/or receiving radio-frequency signals using the antennas on the antenna module.

The patch element 80 in ultra-wideband antenna 40H-1 may have a length L1 (e.g., length 86 of FIG. 8) that is selected to configure ultra-wideband antenna 40H-1 to radiate in the high ultra-wideband communications band. Similarly, the patch element 80 in ultra-wideband antenna 40L may have a length L2 (e.g., length 86 of FIG. 8) that is selected to configure ultra-wideband antenna 40L to radiate in the low ultra-wideband communications band. Length L2 may therefore be longer than length L1.

However, space is at a premium in devices such as device 10. To conserve space within antenna module 90 and thus device 10, the antenna radiating element (e.g., patch element 80) in one or more of the ultra-wideband antennas on substrate 88 may be distributed (vertically stacked) across multiple dielectric layers in substrate 88. This may cause the effective electrical length of the antenna radiating element (e.g., patch element 80) to extend vertically in the Z dimension in addition to extending laterally in the X-Y plane. Extending the effective electrical length of the patch element into the Z dimension may allow the patch element to occupy less lateral area on antenna module 90 while still radiating at the corresponding frequencies of interest.

For example, the patch elements 80 in ultra-wideband antennas 40H-2 and 40H-3 may be distributed (stacked) across multiple dielectric layers in substrate 88. As shown in FIG. 9, the patch element 80 in ultra-wideband antenna 40H-2 and the patch element 80 in ultra-wideband antenna 40H-3 may each have a first edge 96 and an opposing second edge 98. Conductive vias 94 may couple edges 96 and 98 of the patch elements to overlapping parasitic elements (e.g., conductive patches) on one or more of the stacked dielectric layers of substrate 88 (e.g., layers other than the layers used to pattern patch elements 80). This may extend the effective electrical length of the patch elements 80 in ultra-wideband antennas 40H-2 and 40H-3 to length L1 of ultra-wideband antenna 40H-1, thereby configuring ultra-wideband antennas 40H-2 and 40H-3 to radiate in the high ultra-wideband communications band, while reducing the length of the patch elements 80 on antenna module 90 (in the X-Y plane) to a length L3 that is less than length L1. This may serve to minimize the lateral footprint of ultra-wideband antennas 40H-2 and 40H-3 and thus the overall area required for antenna module 90 without changing the frequency band covered by the antennas. Ultra-wideband antennas 40H-2 and 40H-3 may each extend across less lateral surface area (e.g., may have a smaller foot print) than ultra-wideband antenna 40H-1, for example.

In general, ultra-wideband antenna 40H-1 may be laterally separated from ultra-wideband antennas 40H-2 and 40H-3 by gap G. Selecting a relatively large gap G may allow control circuitry 38 (FIG. 2) to resolve the angle of arrival of incoming radio-frequency signals with relatively high accuracy and/or precision, for example. To minimize space consumption within device 10, ultra-wideband antenna 40L may be laterally interposed between ultra-wideband antenna 40H-1 and ultra-wideband antennas 40H-2 and 40H-3 (e.g., within gap G).

Antenna module 90 may be mounted at any desired location within device 10. If desired, antenna module 90 may be pressed against or layered adjacent to rear housing wall 12R of device 10 (FIG. 1). This may configure the antennas on antenna module 90 to convey radio-frequency signals through rear housing wall 12R. In examples where rear housing wall 12R includes a conductive support plate, apertures in the conductive support plate may be aligned with the antennas in antenna module 90 to allow the antennas to radiate through rear housing wall 12R. In other arrangements, the antennas in antenna module 90 may radiate through display 14 and/or peripheral conductive housing structures 12W (FIG. 1).

The example of FIG. 9 is merely illustrative. The antennas in antenna module 90 may be implemented using any desired antenna structures having any desired shapes. Antenna module 90 may include any desired number of antennas for radiating in any desired frequency bands. Substrate 88 may have any desired shape. Any combination of one or more (e.g., all) of ultra-wideband antennas 40H-1, 40H-2, 40H-3, and 40L may be distributed across multiple layers of substrate 88 using conductive vias 94 for minimizing the lateral area of antenna module 90.

Figure 10:
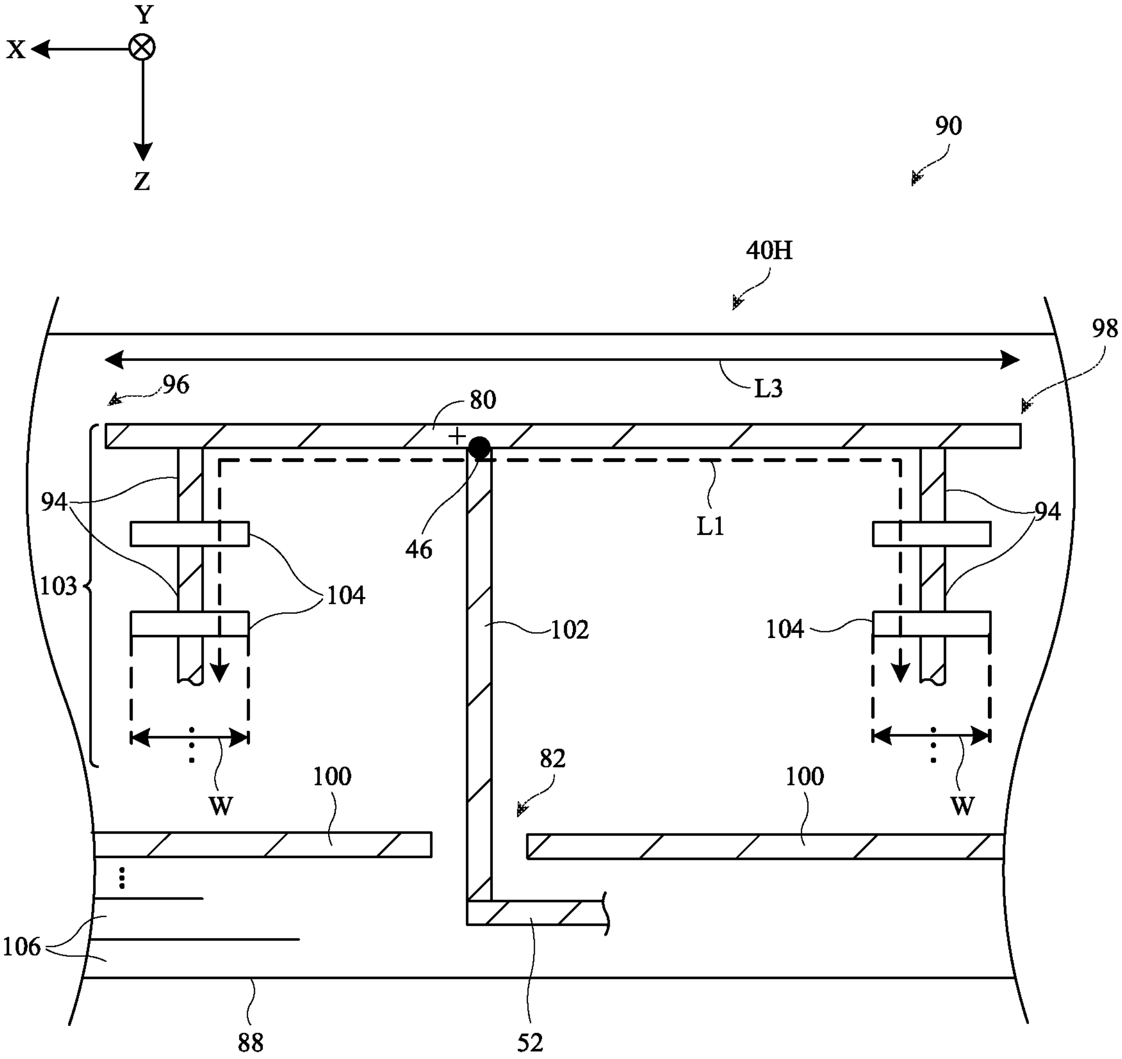
FIG. 10 is a cross-sectional side view of an illustrative ultra-wideband antenna having a multi-layer radiating element in accordance with some embodiments.

FIG. 10 is a cross-sectional side view of a given ultra-wideband antenna 40H that has an antenna radiating element that is vertically distributed in substrate 88 to minimize the lateral area of patch element 80 (e.g., ultra-wideband antenna 40H-2 or 40H-3 of FIG. 9). As shown in FIG. 10, substrate 88 of antenna module 90 may include multiple stacked dielectric layers 106 (e.g., layers of printed circuit board substrate, layers of fiberglass-filled epoxy, layers of polyimide, layers of ceramic substrate, or layers of other dielectric materials).

Ground traces 100 (e.g., ground plane 78 of FIG. 8) may be layered onto a first dielectric layer 106. Patch element 80 may be layered onto a second dielectric layer 106. Zero, one, or more than one dielectric layer 106 may be layered over patch element 80. Two or more dielectric layers may be stacked between patch element 80 and ground traces 100. A conductive via 102 (sometimes referred to herein as feed via 102) may couple signal conductor 52 to positive antenna feed terminal 46 on patch element 80 through hole 82 in ground traces 100.

The antenna radiating element in ultra-wideband antenna 40H may also include one or more parasitic elements 104 formed from patches of conductive traces on one or more dielectric layers 106 that are interposed between ground traces 100 and patch element 80. Parasitic elements 104 may sometimes be referred to herein as patch elements 104, parasitic patch elements 104, parasitic patches 104, parasitics 104, or loading patches 104. Conductive vias 94 may couple edge 96 of patch element 80 and may couple edge 98 of patch element 80 to respective parasitic elements 104 in at least one layer of parasitic elements 104. Each parasitic element 104 may, for example, extend across the width of patch element 80 (measured parallel to the Y-axis) and may be coupled to patch element 80 by a set of conductive vias 94 (e.g., a fence of conductive vias 94).

Conductive vias 94, patch element 80, and parasitic elements 104 may sometimes be referred to collectively herein as the antenna radiating element 103 for ultra-wideband antenna 40H. Because antenna radiating element 103 is distributed across multiple dielectric layers 106, antenna radiating element 103 may sometimes also be referred to herein as multi-layer antenna radiating element 103. Antenna radiating element 103 may include only a single layer of parasitic elements 104 (e.g., a first parasitic element 104 on a given dielectric layer 106 and coupled to edge 96 of patch element 80 and a second parasitic element 104 on the given dielectric layer 106 and coupled to edge 98 of patch element 80) or may include two or more layers of parasitic elements 104 (e.g., third and fourth parasitic elements 104 on an additional dielectric layer 106 under the given dielectric layer 106, etc.).

Parasitic elements 104 and conductive vias 94 may serve to extend the effective electrical length of antenna radiating element 103 to equal length L1 (e.g., for radiating in the high ultra-wideband communications band), thereby allowing patch element 80 to exhibit only length L3 in the X-Y plane without affecting the frequencies covered by the antenna. In general, increasing the number of parasitic elements 104 (e.g., the number of layers of parasitic elements 104 stacked under patch element 80) may serve to coarsely tune the radiating frequencies of antenna radiating element 103 (e.g., to lower frequencies as more layers are added). Parasitic elements 104 may also have width W. Width W may be adjusted to fine-tune the radiating frequencies of antenna radiating element 103. Parasitic elements 104 may, for example, capacitively load patch element 80 and antenna radiating element 103 to shift the overall frequency response of the antenna (e.g., where larger widths W produce more capacitive loading than smaller widths W).

Figure 11:
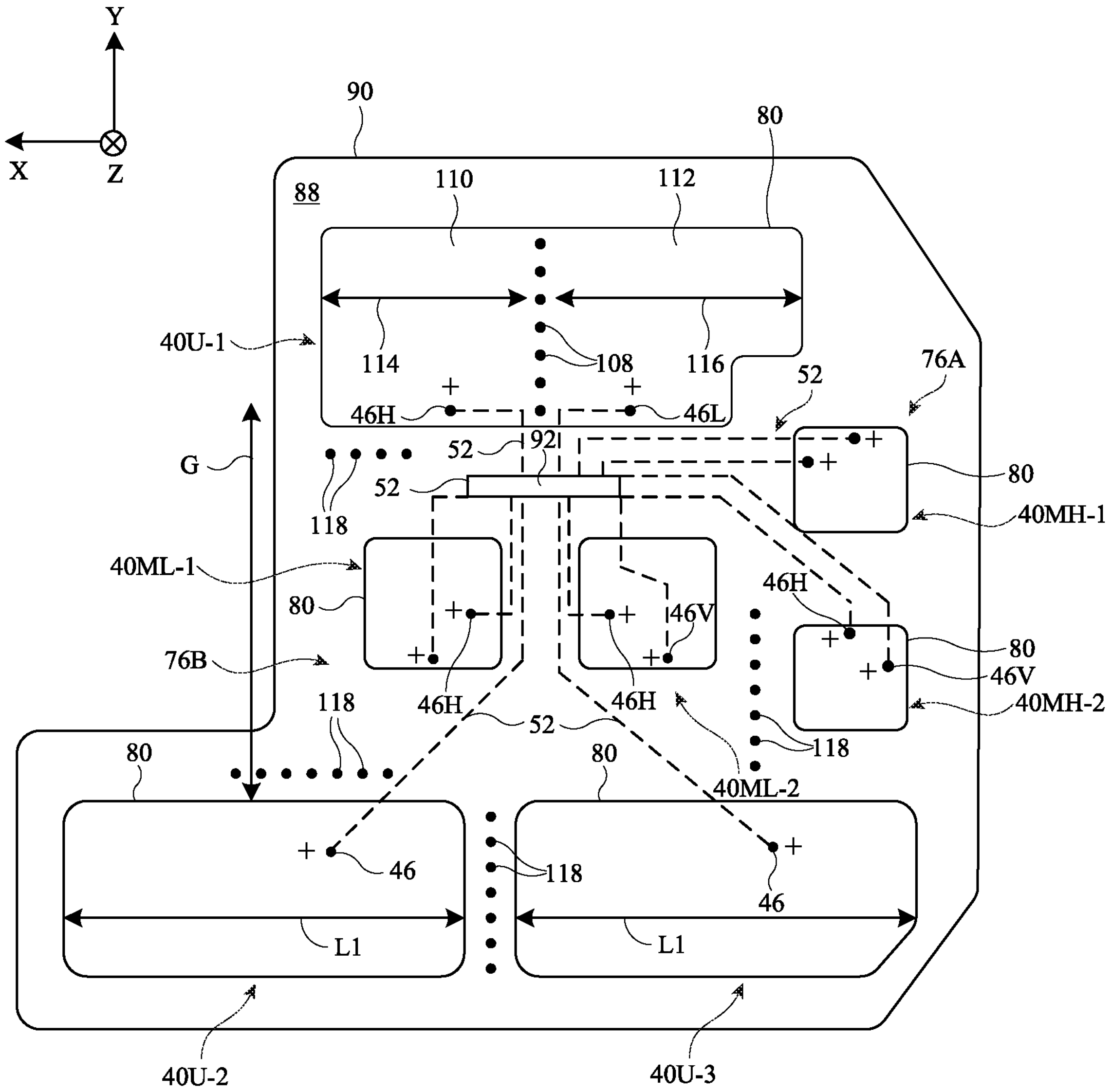
FIG. 11 is a bottom view of an illustrative antenna module having ultra-wideband antennas and phased antenna arrays in accordance with some embodiments.

To further minimize space consumption within device 10, a triplet of ultra-wideband antennas and first and second phased antenna arrays may each be formed as part of antenna module 90. FIG. 11 is a bottom view showing how the triplet of ultra-wideband antennas and the first and second phased antenna arrays may each be disposed on antenna module 90.

As shown in FIG. 11, antenna module 90 may include a triplet of ultra-wideband antennas 40U such as ultra-wideband antennas 40U-1, 40U-2, and 40U-3. Ultra-wideband antennas 40U-1, 40U-2, and 40U-3 may convey radio-frequency signals in one or more ultra-wideband frequency bands. For example, ultra-wideband antennas 40U-2 and 40U-3 may convey radio-frequency signals in the high ultra-wideband communications band whereas ultra-wideband antenna 40U-1 conveys radio-frequency signals in both the high ultra-wideband communications band and the low ultra-wideband communications band.

Each ultra-wideband antenna 40U may have a corresponding antenna resonating element such as a corresponding patch element 80. The patch elements 80 in ultra-wideband antennas 40U-2 and 40U-3 may, for example, each have length L1. This is merely illustrative and, if desired, one or both the ultra-wideband antennas 40U-2 and 40U-3 may include patch elements with length L3 and parasitic elements 104 coupled to the patch elements by conductive vias 94 (e.g., as shown in FIG. 10).

As shown in FIG. 11, ultra-wideband antenna 40U-1 may have a patch element 80 that includes a first antenna radiating (resonating) element arm 110 and a second antenna radiating element arm 112. Antenna radiating element arms 110 and 112 may be formed from conductive traces on substrate 88. Antenna radiating element arm 110 may be fed by positive antenna feed terminal 46H whereas antenna radiating element arm 112 is fed by positive antenna feed terminal 46L. Positive antenna feed terminals 46L and 46H may each be coupled to radio-frequency connector 92 over a respective signal conductor 52 in substrate 88 (e.g., over respective radio-frequency transmission line paths).

Antenna radiating element arms 110 and 112 may be separated by a fence of conductive vias 108 that couple the conductive traces forming antenna radiating element arms 110 and 112 to the ground traces in dielectric substrate 88. The fence of conductive vias 108 may form a return path for ultra-wideband antenna 40U-1. The antenna radiating element for ultra-wideband antenna 40U-1 may therefore by a dual-band planar-inverted-F antenna resonating element (e.g., antenna radiating element arms 110 and 112 may be planar inverted-F antenna resonating element arms extending from opposing sides of conductive vias 108).

Antenna radiating element arm 110 may have a length 114 (e.g., parallel to the X-axis) that is selected to configure ultra-wideband antenna 40U-1 to radiate in the high ultra-wideband communications band (e.g., the 8.0 GHz UWB frequency band). This may configure ultra-wideband antenna 40U-1 to form a triplet in the high ultra-wideband communications band with ultra-wideband antennas 40U-2 and 40U-3. At the same time, antenna radiating element arm 112 may have a length 116 that is selected to configure ultra-wideband antenna 40U-1 to also radiate in the low ultra-wideband frequency band (e.g., the 6.5 GHZ UWB frequency band). This is merely illustrative. If desired, ultra-wideband antenna 40U-1 may be a single band antenna. If desired, one or both of ultra-wideband antennas 40U-2 and 40U-3 may be dual-band antennas like the ultra-wideband antenna 40U-1 shown in FIG. 11 for conveying radio-frequency signals in both the 6.5 GHZ and 8.0 GHz UWB frequency bands.

As shown in FIG. 11, antenna module 90 may also include multiple phased antenna arrays 76 (FIG. 7) such as first phased antenna array 76A and second phased antenna array 76B. First phased antenna array 76A may include a first set of antennas 40 that radiate in a relatively high 5G NR FR2 frequency band (e.g., at frequencies between about 37-43 GHZ). First phased antenna array 76A may include any desired number of antennas 40MH. In the example of FIG. 11, first phased antenna array 76A includes four antennas 40MH such as antennas 40MH-1 and 40MH-2. Each antenna 40MH in first phased antenna array 76A may be separated from one or two adjacent antennas 40MH in first phased antenna array 76A by a distance selected to allow the antennas 40MH in first phased antenna array 76A to perform satisfactory beam forming operations (e.g., the distance may be approximately equal to one-half the effective wavelength of operation of antennas 40MH).

Second phased antenna array 76B may include a set of antennas 40ML that radiate in a relatively low 5G NR FR2 frequency band (e.g., at frequencies between about 24-30 GHZ). Second phased antenna array 76B may include any desired number of antennas 40ML such as a first antenna 40ML-1 and a second antenna 40ML-2. Each antenna 40ML in second phased antenna array 76B may be separated from one or two adjacent antennas 40ML in second phased antenna array 76B by a distance selected to allow the antennas 40ML in second phased antenna array 76B to perform satisfactory beam forming operations (e.g., the distance may be approximately equal to one-half the effective wavelength of operation of antennas 40ML). If desired, second phased antenna array 76B may be steered independently of first phased antenna array 76A. For example, first phased antenna array 76A may convey radio-frequency signals within a first signal beam whereas second phased antenna array 76B conveys radio-frequency signals within a second signal beam.

The antennas in second phased antenna array 76B may be located on portions (regions) of dielectric substrate 88 that are not occupied by first phased antenna array 76A and ultra-wideband antennas 40U-1, 40U-2, and 40U-3. For example, as shown in FIG. 11, antennas 40ML-1 and 40ML-2 may be arranged in a row and may be laterally interposed between ultra-wideband antenna 40U-1 and ultra-wideband antennas 40U-2 and 40U-3 (e.g., within gap G). At the same time, antennas 40MH-1 and 40MH-2 may be arranged in a column at an edge of substrate 88 (e.g., laterally interposed between first phased antenna array 76A and the right edge of dielectric substrate 88). This is merely illustrative and, in general, the antennas in phased antenna arrays 76A and 76B may be arranged in any desired patterns.

The antennas 40ML and 40MH on antenna module 90 may be formed using any desired antenna structures. For example, antennas 40ML and 40MH may be stacked patch antennas. Each stacked patch antenna may include a respective patch element 80 formed from a patch of conductive traces on dielectric substrate 88 and one or more parasitic elements (patches) stacked over, under, and/or coplanar with the patch element 80. The patch elements 80 in antennas 40ML and 40MH may each be directly feed by respective positive antenna feed terminals 46H and 46V for covering different polarizations or may each be fed by only a single positive antenna feed terminal.

If desired, fences of conductive vias 118 may extend through substrate 88 to the ground traces in substrate 88 and may laterally surround each patch element 80 in antenna module 90 (e.g., by forming cavities in which the patch elements are disposed). Laterally interposing fences of conductive vias 118 between each pair of antennas on antenna module 90 may help to minimize interference between the antennas.

As shown in FIG. 11, respective signal conductors (radio-frequency transmission lines) may couple radio-frequency connector 92 to each of the positive antenna feed terminals 46 on antenna module 90. Each of the signal conductors 52 may, if desired, be formed from signal traces on a corresponding dielectric layer of substrate 88 (e.g., from the same metallization layer on substrate 88). However, due to the high routing complexity of antenna module 90, one or more of the signal conductors may include signal traces on an additional dielectric layer of substrate 88 (e.g., signal conductors formed from an additional metallization layer). Conductive vias may couple the signal conductors on one dielectric layer to the signal conductors on the other dielectric layers. Vertically distributing one or more of the signal conductors may allow more room on substrate 88 to feed each of the many antennas on antenna module 90. As an example, the signal conductors 52 coupled to positive antenna feed terminals 46L and 46H of ultra-wideband antenna 40U-1 may each be distributed across two metallization layers of substrate 88 (e.g., may each include signal traces on two metallization layers that are coupled together by conductive via(s)).

Figure 12:
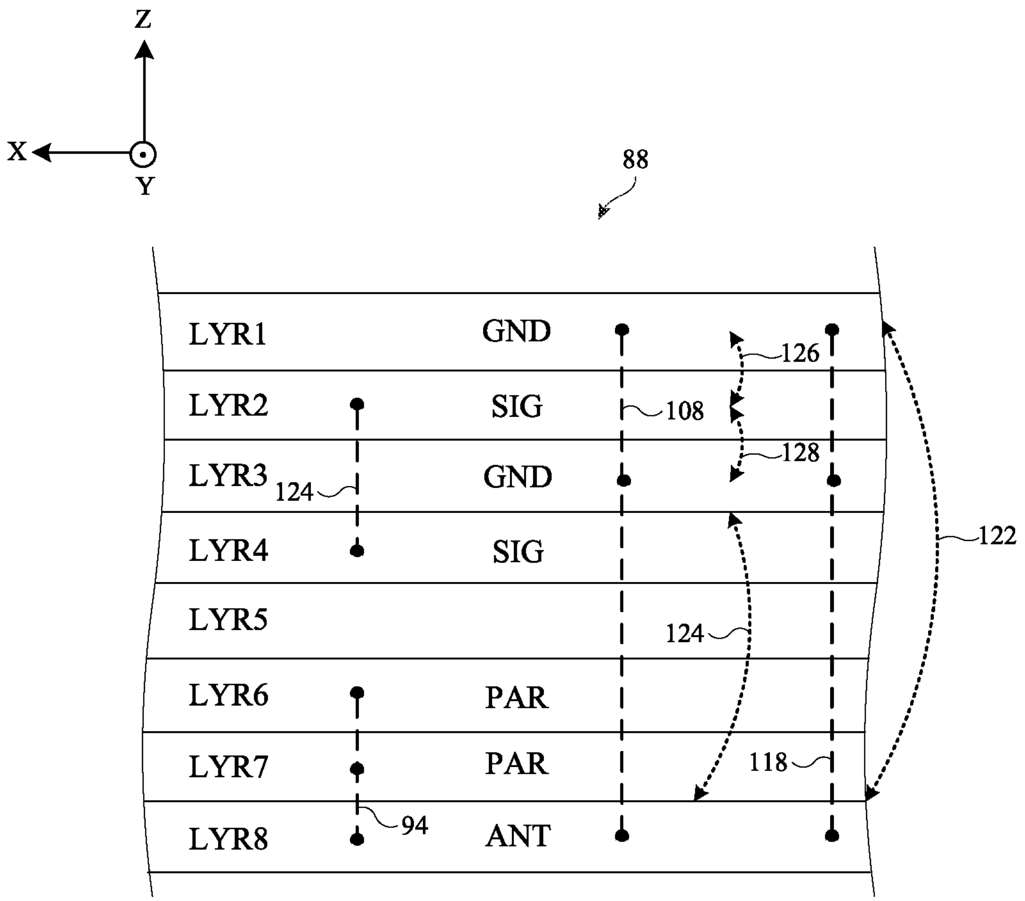
FIG. 12 is a cross-sectional schematic showing how an illustrative antenna module may include multiple metallization layers for supporting ultra-wideband antennas and phased antenna arrays on the antenna module in accordance with some embodiments.

FIG. 12 is a cross-sectional schematic side view showing how the metallization layers of substrate 88 may be leveraged to form and feed each of the antennas on antenna module 90 of FIG. 11. As shown in FIG. 12, substrate 88 may include at least eight metallization layers LYR (e.g., metallization layers LYR1, LYR2, LYR3, LYR4, LYR5, LYR6, LYR7, and LYR8). Each metallization layer LYR is layered onto a respective dielectric layer 106 (FIG. 10) of substrate 88, which have been omitted from FIG. 12 for the sake of clarity (e.g., there may be a respective dielectric layer 106 over each metallization layer LYR). Each metallization layer LYR may include conductive traces (e.g., copper traces, contact pads, etc.).

Metallization layer LYR8 may be an antenna (ANT) layer. The conductive traces of metallization layer LYR8 may be used to form the patch element 80 for antennas 40U-1, 40U-2, 40U-3, 40ML-1, 40ML-2, 40MH-1, and 40MH-2 of FIG. 11. Metallization layers LYR7 and LYR6 may be parasitic (PAR) layers. The conductive traces of metallization layers LYR7 and LYR6 may be used to form one or more parasitic elements for antennas 40ML-1, 40ML-2, 40MH-1, and/or 40MH-2 of FIG. 11 (e.g., for broadening the bandwidth of the antennas). If desired, metallization layers LYR7 and/or LYR6 may be used to form parasitic elements for one or more of ultra-wideband antennas 40U-1, 40U-2, and 40U-3 (e.g., parasitic elements 104 of FIG. 10). In these examples, conductive vias 94 may couple the patch element 80 in ultra-wideband antennas 40U-1, 40U-2, and 40U-3 (metallization layer LYR8) to the parasitic elements in metallization layers LYR7 and/or LYR6.

Metallization layer LYR5 may be a spacer layer that helps to provide substrate 88 with a desired thickness. Metallization layer LYR5 may be omitted if desired. Metallization layers LYR2 and LYR4 may be signal (SIG) layers. Metallization layers LYR1 and LYR3 may be ground (GND) layers. The conductive traces in ground layers LYR1 and LYR3 may be used to form the ground plane (e.g., an electrical ground reference potential) for the conductive traces in one or more of the metallization layers of substrate 88.

The conductive traces of metallization layer LYR2 may be used to form signal conductors 52 for antennas 40U-1, 40U-2, 40U-3, 40ML-1, 40ML-2, 40MH-1, and 40MH-2 of FIG. 11 (sometimes referred to herein as signal traces). Ground layers LYR1 and/or LYR3 may form the ground reference for metallization layer LYR2, as shown by arrows 126 and 128 (e.g., metallization layers LYR1-LYR3 may form the radio-frequency transmission line paths for the antennas). To allow for flexible routing, signal traces in metallization layer LYR4 may be used to form at least part of the signal conductor for one or more of the antennas on antenna module 90. For example, signal traces in metallization layer LYR4 may be used to form part of the signal conductors 52 coupled to positive antenna feed terminals 46L and 46H on ultra-wideband antenna 40U-1 of FIG. 11. In these examples, conductive vias such as conductive via 124 may couple the signal traces in metallization layer LYR4 to the signal traces in metallization layer LYR2 to form signal conductors 52 for ultra-wideband antenna 40U-1. There may also be conductive traces held at a ground potential (ground traces) in metallization layers LYR2, LYR4, LYR5, LYR6, LYR7, and/or LYR8 (e.g., ground fill to help electromagnetically isolate the transmission lines and antennas from each other).

Conductive vias 118 may be used to couple metallization layer LYR8 (e.g., landing pads in metallization layer LYR8) to ground traces in metallization layers LYR1 and/or LYR3 (e.g., to form fences of conductive vias that help to electromagnetically isolate the antennas). Conductive vias 108 may couple one or more patch elements 80 in metallization layer LYR8 (e.g., the patch element 80 of ultra-wideband antenna 40U-1 of FIG. 11) to ground traces in metallization layers LYR1 and/or LYR3. Ground traces in metallization layer LYR3 may form the ground reference (ground plane 78 of FIG. 8) for antennas 40ML-1, 40ML-2, 40MH-1, and 40MH-2 of FIG. 11, as shown by arrow 124. Ground traces in metallization layer LYR1 may form the ground reference (ground plane 78 of FIG. 8) for ultra-wideband antennas 40U-1, 40U-2, and 40U-3 of FIG. 11, as shown by arrow 122.

In this way, the antennas on antenna module 90 may be fed in a space-efficient manner that minimizes the size of antenna module 90 without sacrificing the wireless performance of the antennas, despite antenna module 90 including both ultra-wideband antennas and phased antenna arrays that operate at centimeter and/or millimeter wave frequencies. The example of FIG. 12 is merely illustrative. There may be fewer than eight or more than eight metallization layers in substrate 88. Other metallization schemes may be used.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a substrate;

a first conductive patch on a first layer of the substrate, wherein the first conductive patch has an edge;

a second conductive patch on a second layer of the substrate;

a positive antenna feed terminal on the first conductive patch;

conductive vias that couple the edge of the first conductive patch to the second conductive patch through the first layer, wherein the first conductive patch, the second conductive patch, and the conductive vias form a first antenna configured to radiate in an ultra-wideband communications band, a length extending from the edge of the first conductive patch, through the conductive vias, and across the second conductive patch configuring the first conductive patch, the second conductive patch, and the conductive vias to collectively radiate in the ultra-wideband communications band; and a ground plane, wherein the first conductive patch is coupled to the ground plane.

2. The electronic device of claim 1, wherein the first conductive patch has a first length and a first width perpendicular to the first length, the second conductive patch having a second width parallel to the first width.

3. The electronic device of claim 2, wherein the second width of the second conductive patch is less than the first width of the first conductive patch.

4. The electronic device of claim 2, wherein the second width of the second conductive patch is configured to adjust a collective radiating frequency of the first conductive patch, the second conductive patch, and the conductive vias.

5. The electronic device of claim 1, wherein the ultra-wideband communications band comprises a 8.0 GHz band or a 6.5 GHz band.

6. The electronic device of claim 1, wherein the first antenna comprises a planar inverted-F antenna.

7. The electronic device of claim 1, further comprising:

a second antenna; and a third antenna, wherein the first, second, and third antennas form a triplet of antennas on the substrate, the triplet of antennas being configured to receive first radio-frequency signals in the ultra-wideband communications band.

8. The electronic device of claim 7, further comprising:

a first phased antenna array on the substrate and configured to convey second radio-frequency signals at a first frequency greater than 10 GHZ, wherein the first phased antenna array is laterally interposed between the first antenna in the triplet of antennas and the second and third antennas in the triplet of antennas; and a second phased antenna array on the substrate and configured to convey third radio-frequency signals at a second frequency greater than the first frequency.

9. The electronic device of claim 7, further comprising:

a fourth antenna on the substrate, wherein the fourth antenna is configured to receive second radio-frequency signals in an additional ultra-wideband communications band that is lower than the ultra-wideband communications band, the fourth antenna being laterally interposed between the first antenna in the triplet of antennas and the second and third antennas in the triplet of antennas.

10. The electronic device of claim 9, further comprising:

control circuitry configured to identify an angle-of-arrival of the first radio-frequency signals received by the first, second, and third antennas in the ultra-wideband communications band and configured to identify a time-of-flight of the second radio-frequency signals received by the fourth antenna in the additional ultra-wideband communications band.

11. The electronic device of claim 1, wherein the substrate comprises a printed circuit board.

12. The electronic device of claim 1, further comprising:

peripheral conductive housing structures;

a display mounted to the peripheral conductive housing structures; and a rear housing wall mounted to the peripheral conductive housing structures opposite the display, wherein the first and second conductive patches are further configured to receive radio-frequency signals through the rear housing wall.

13. The electronic device of claim 1, further comprising:

a fence of additional conductive vias that surrounds the first conductive patch.

14. The electronic device of claim 1, further comprising:

a third conductive patch on the first layer; and a fence of additional conductive vias interposed between the first conductive patch and the third conductive patch.

15. The electronic device of claim 1, wherein the first conductive patch overlaps the second conductive patch in a direction parallel to a surface normal of the first conductive patch.

16. An antenna comprising:

a first patch element on a first dielectric layer;

a second patch element on a second dielectric layer and overlapping the first patch element;

an antenna ground on a third dielectric layer, wherein the second patch element is interposed between the first patch element and the antenna ground, the first patch element being shorted to the antenna ground; and conductive vias that couple the first patch element to the second patch element through the first dielectric layer, wherein the first patch element, the second patch element, and the conductive vias form an antenna configured to radiate in an ultra-wideband communications band, a length extending across the first patch element, through the conductive vias, and across the second patch element configuring the first patch element, the second patch element, and the conductive vias to collectively radiate in the ultra-wideband communications band.

17. The antenna of claim 16, wherein the first patch element has a first length and a first width perpendicular to the first length, the second patch having a second width parallel to the first width and less than the first width.

18. An electronic device comprising:

a dielectric substrate;

a first conductive patch on a first layer of the dielectric substrate and having a first width;

a positive antenna feed terminal on the first conductive patch;

a ground plane, wherein the first conductive patch is shorted to the ground plane;

a second conductive patch on a second layer of the dielectric substrate and having a second width less than the first width; and conductive vias that couple the first conductive patch to the second conductive patch through the first layer, wherein the first conductive patch, the second conductive patch, and the conductive vias form an antenna configured to radiate in an ultra-wideband communications band, a length extending across the first conductive patch, through the conductive vias, and across the second conductive patch configuring the first conductive patch, the second conductive patch, and the conductive vias to collectively radiate in the ultra-wideband communications band.

* * * * *